(12) United States Patent
Kitaori et al.

(10) Patent No.: US 8,738,253 B2
(45) Date of Patent: May 27, 2014

(54) AUTOMATIC TRANSMISSION CONTROL APPARATUS, CONTROL METHOD, PROGRAM FOR REALIZING THAT METHOD, AND RECORDING MEDIUM ON WHICH THAT PROGRAM IS RECORDED

(75) Inventors: Ichiro Kitaori, Nagoya (JP); Hiroyuki Sawada, Okazaki (JP); Yoshio Hasegawa, Chiryu (JP); Kazuyuki Shiiba, Toyota (JP); Toshihiro Fukumasu, Nagoya (JP); Nobufusa Kobayashi, Chiryu (JP); Seiji Kuwahara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 359 days.

(21) Appl. No.: 12/745,382

(22) PCT Filed: Dec. 18, 2008

(86) PCT No.: PCT/IB2008/003532
§ 371 (c)(1),
(2), (4) Date: May 28, 2010

(87) PCT Pub. No.: WO2009/081257
PCT Pub. Date: Jul. 2, 2009

(65) Prior Publication Data
US 2010/0305823 A1    Dec. 2, 2010

(30) Foreign Application Priority Data
Dec. 19, 2007    (JP) .................................. 2007-327456

(51) Int. Cl.
*G06F 7/00*    (2006.01)
*G06F 17/00*   (2006.01)
*G06F 19/00*   (2011.01)

(52) U.S. Cl.
USPC .......................................................... 701/58

(58) Field of Classification Search
USPC .......................................................... 701/58
See application file for complete search history.

(56) References Cited

U.S. PATENT DOCUMENTS

| 4,852,006 A | 7/1989 | Speranza |
| 6,246,940 B1 | 6/2001 | Ochiai et al. |

(Continued)

FOREIGN PATENT DOCUMENTS

| EP | 1 130 292 A1 | 9/2001 |
| JP | A-06-221418 | 8/1994 |

(Continued)

OTHER PUBLICATIONS

Oct. 25, 2011 Office Action issued in JP Application No. 2010-003106 (with English translation).

(Continued)

*Primary Examiner* — Maceeh Anwari
(74) *Attorney, Agent, or Firm* — Oliff PLC (57) ABSTRACT

An ECU controls an automatic transmission that can be manually shifted. The ECU executes a program that includes i) the step of, when there are a plurality of allowed gears that are allowed at the time of a downshift operation, continuously determining whether the engine speed NE after a downshift will be in a preset overspeed region for each allowed gear when the second and subsequent allowed gears are lower than an output gear, and when there is an allowed gear that will result in the engine speed NE being in the overspeed region, ii) the step of cancelling that allowed gear. Thus this control appropriately suppresses overspeeding of the engine while executing a manual shift in response to an operation by the driver without bothering the driver.

9 Claims, 8 Drawing Sheets

(56) References Cited

U.S. PATENT DOCUMENTS

| | | |
|---|---|---|
| 6,374,688 B1 | 4/2002 | Bockmann et al. |
| 2001/0020206 A1 | 9/2001 | Nishimura |
| 2007/0099751 A1 | 5/2007 | Terayama et al. |

FOREIGN PATENT DOCUMENTS

| | | | |
|---|---|---|---|
| JP | 08-210495 | * | 8/1996 |
| JP | A 8-210495 | | 8/1996 |
| JP | 09-79373 | * | 3/1997 |
| JP | A 9-79373 | | 3/1997 |
| JP | A-11-030329 | | 2/1999 |
| JP | A-11-037282 | | 2/1999 |
| JP | A 2000-324614 | | 11/2000 |
| JP | A-2001-280470 | | 10/2001 |
| JP | A 2001-336630 | | 12/2001 |
| JP | A-2007-315414 | | 12/2007 |

OTHER PUBLICATIONS

International Search Report issued in International Patent Application No. PCT/IB2008/003532; mailed Apr. 27, 2009.
Office Action issued in Japanese Patent Application No. 2007-327456; Nov. 4, 2009; with English-language translation.
Written Opinion issued in International Patent Application No. PCT/IB2008/003532; mailed Apr. 27, 2009.

* cited by examiner

| VEHICLE SPEED V (km/h) | 0~80 | 80~120 | 120~ |
|---|---|---|---|
| CONSECUTIVE DOWNSHIFT LIMIT (NUMBER OF TIMES) | 4 | 3 | 2 |

FIG. 9

| GEAR BEFORE SHIFT OPERATION (GEAR) | 1~3 | 4、5 | 6 |
|---|---|---|---|
| CONSECUTIVE DOWNSHIFT LIMIT (NUMBER OF TIMES) | 4 | 3 | 2 |

FIG. 10

| ACCELERATOR OPERATION AMOUNT ACC (%) | 0~5 | 5~30 | 30~ |
|---|---|---|---|
| CONSECUTIVE DOWNSHIFT LIMIT (NUMBER OF TIMES) | 5 | 4 | 3 |

AUTOMATIC TRANSMISSION CONTROL APPARATUS, CONTROL METHOD, PROGRAM FOR REALIZING THAT METHOD, AND RECORDING MEDIUM ON WHICH THAT PROGRAM IS RECORDED

The disclosure of Japanese Patent Application No. 2007-327456 filed on Dec. 19, 2007, including the specification, drawings and abstract is incorporated herein by reference in its entirety.

BACKGROUND OF THE INVENTION

1. Field of the Invention

The invention relates to control of a vehicular automatic transmission, and more particularly, control of an automatic transmission that is able to be manually shifted in response to an operation by a driver.

2. Description of the Related Art

A vehicle is known which has an automatic transmission that is controlled according to one of a plurality of shift positions including a forward drive (D) position, a park (P) position, a reverse (R) position, and a neutral (N) position and the like. When such a vehicle is running in the D position, the automatic transmission shifts based on the state of the vehicle (e.g., vehicle speed, accelerator operation amount, and the like) according to a shift map stored in advance, irrespective of the intentions of the driver (hereinafter, this kind of shift may also be referred to as an "automatic shift"). In recent years, there have also come to be automatic transmissions that not only shift automatically, but which also allow the driver to shift as he or she desires by operating a switch or lever (hereinafter such a shift may also be referred to as a "manual shift"). Japanese Patent Application Publication No. 8-210495 (JP-A-8-210495), for example, describes technology that executes a shift command by a driver while preventing the engine from overspeeding (overrevving) or stalling in a vehicle provided with an automatic transmission in which such a manual shift is possible.

The control apparatus described in JP-A-8-210495 is a vehicular automatic transmission control apparatus that controls shifting in the automatic transmission based on the output from a vehicle speed detecting portion that detects a value indicative of the vehicle speed and the output from an engine load detecting portion that detects a value indicative of the engine load. This control apparatus includes a shift command portion that outputs a predetermined shift command in response to a manual operation, a region setting portion that sets a shift-allowed region in which a shift command output by the shift command portion is allowed to be executed and a shift-prohibited region in which a shift command output by the shift command portion is prohibited from being executed, and a delay portion that executes a shift command when the state of the vehicle moves into the shift-allowed region within a predetermined period of time after the shift command portion outputs a shift command when the state of the vehicle is in the shift-prohibited region. Incidentally, when a shift switch is operated three or more times in succession, the control apparatus stores the first two operations and ignores the rest.

As described above, the control apparatus described in JP-A-8-210495 delays execution of a shift command when the shift command is output while the state of the vehicle is in the shift-prohibited region and then executes that shift command if the state of the vehicle moves into the shift-allowed region within a predetermined period of time after that shift command is output. Accordingly, not only can the engine be prevented from overrevving or stalling if an inappropriate shift command is given, but the shift command by the driver can also be executed as quickly as possible without the driver having to perform the operation again.

However, the control apparatus described in JP-A-8-210495 has the following problem when a downshift is performed a plurality of times within a short period of time. That is, if the shift switch is operated three or more times in succession, the third and subsequent times are all ignored even if the state of the vehicle is such that the engine will not overspeed, which may bother the driver. Furthermore, all of the determinations of whether to allow or prohibit a shift are made at the time the shift operation is performed. As a result, even if the second shift is allowed, the engine may overspeed when that shift is executed if the vehicle speed, increases as a result of the accelerator being depressed while the first shift is being executed after the shift operation is performed, for example. Moreover, when the second shift output is prohibited, the second shift determination is already made so the second shift will be executed after delaying the shift output until the state of the vehicle moves into the shift-allowed region as a result of the accelerator being released or the vehicle speed decreasing. Therefore, there is a longer time lag between the time that the shift operation is performed and the time that the second shift is executed, which may bother the driver.

SUMMARY OF THE INVENTION

This invention attempts to solve the foregoing problems by providing a control apparatus and control method able to execute a manual shift in response to an operation by a driver without bothering the driver while appropriately preventing an engine from overspeeding, in an automatic transmission capable of performing a manual shift in response to an operation by the driver. The invention also relates to a program that realizes that control method and a recording medium on which that program is recorded.

Therefore, one aspect of the invention relates to a control apparatus for an automatic transmission that can be manually shifted in response to an operation by a driver. This control apparatus includes a detecting device that detects a downshift operation by the driver; a shift determining device that makes a shift determination corresponding to the detected downshift operation; an output device that outputs a shift output based on the shift determination to the automatic transmission; an overspeed determining device which, when there is a shift determination that is different from the shift output as a result of the downshift operation being detected successively, determines whether an engine will overspeed as a result of a downshift based on the different shift determination; and a cancelling device that cancels a shift determination that is determined to cause the engine to overspeed.

Also, another aspect of the invention relates to a control method for an automatic transmission that can be manually shifted in response to an operation by a driver. This control method includes the step of detecting a downshift operation by the driver; the step of making a shift determination corresponding to the detected downshift operation; the step of outputting a shift output based on the shift determination to the automatic transmission; the step of, when there is a shift determination that is different from the shift output as a result of the downshift operation being detected successively, determining whether an engine will overspeed as a result of a downshift based on the different shift determination; and the step of canceling a shift determination that is determined to cause the engine to overspeed.

According to the control apparatus and control method for an automatic transmission described above, a shift determination that corresponds to a downshift operation by the driver is made, and a shift output based on that shift determination is output to the automatic transmission. When a downshift operation is detected successively such that a plurality of shift determinations are made, for example, when a shift output based on a successive shift determination is output after waiting until the downshift that is currently being executed has ended (i.e., until the output shaft rotation speed is in sync with the input shaft rotation speed at the gear ratio of the gear being output), there is a time lag between the time the downshift operation is performed by the driver and the time the second and subsequent downshifts are executed. Therefore, when there is a shift determination that is different than the shift output as a result of downshift operations being detected successively (i.e., when the gear corresponding to the shift determination is lower than the gear corresponding to the shift output), it is determined whether the engine will overspeed as a result of a downshift that is based on the different shift determination, and a shift determination that is determined to cause the engine to overspeed is cancelled. In this way, a shift determination that is determined to cause the engine to overspeed is cancelled, which makes it possible to prevent the engine from overspeeding even if the vehicle speed or the like increases between the time a downshift operation is performed and the time the second and subsequent downshifts are executed, for example. In addition, it is possible to inhibit a sudden downshift from being executed when the driver is not expecting it, compared to when the shift determination is not cancelled but instead the shift output is simply delayed based on the shift determination. Furthermore, the number of times a downshift can be executed in response to an operation by the driver is not limited as long as it is determined that that downshift will not result in the engine overspeeding. As a result, in an automatic transmission that can be manually shifted in response an operation by a driver, overspeeding of the engine can be appropriately suppressed while a manual shift in response to an operation by the driver can be executed without bothering the driver.

Also, in the control apparatus and control method described above, determining overspeeding may involve continuing to determine for each different shift determination, when there are a plurality of different shift determinations, whether the engine will overspeed while those different shift determinations are different from the shift output.

According to the control apparatus and control method described above, even if there are a plurality of different shift determinations, whether the engine will overspeed is continuously determined for each of the different shift determinations while the different shift determinations are different from the shift output. Thus it is possible to appropriately determine whether the engine will overspeed up until the time that the downshifts are executed based on the different shift determinations.

Also, in the control apparatus and control method described above, determining overspeeding may involve determining whether the engine will overspeed based on at least one of a vehicle speed and an accelerator operation amount.

According to the control apparatus and control method described above, determining overspeeding may involve determining whether the engine will overspeed based on at least one of a vehicle speed and an accelerator operation amount. Accordingly, for example, even if the vehicle speed is the same (i.e., at a given vehicle speed), when the accelerator operation amount is small, it is determined that the engine will not overspeed between the time a downshift operation is performed and the time the second and subsequent downshifts are executed so downshifts can be inhibited from being cancelled. Therefore, the range over which downshifts requested by the driver are allowed can be expanded compared to when the engine overspeed determination is made based solely on the vehicle speed.

Yet another aspect of the invention relates to a control apparatus for an automatic transmission that can be manually shifted in response to an operation by a driver. This control apparatus includes a detecting device that detects a downshift operation by the driver; and a limiting device that limits the number of accepted downshifts based on the state of a vehicle at the time of the downshift operation when the downshift operation is detected successively.

Still another aspect of the invention relates to a control method for an automatic transmission that can be manually shifted in response to an operation by a driver. This control method includes the step of detecting a downshift operation by the driver; and the step of limiting the number of accepted downshifts based on the state of a vehicle at the time of the downshift operation when the downshift operation is detected successively.

According to the control apparatus and control method described above, when a plurality of downshifts are executed according to the number of times a downshift operation is performed, for example, the engine is more apt to overspeed as a result of a downshift as more downshifts are executed. Therefore, when downshift operations are detected successively, the number of accepted downshifts is limited based on the state of the vehicle at the time of the downshift operation. As a result, when the state of the vehicle at the time a downshift operation is performed is such that the engine is apt to overspeed, the number of accepted downshifts is reduced to inhibit the engine from overspeeding. Furthermore, when the state of the vehicle at the time a downshift operation is performed is such that the engine is not apt to overspeed, the number of accepted downshifts can be increased to inhibit downshifts requested by the driver from being limited unnecessarily, thus suppressing irritation that may otherwise be felt by the driver. As a result, in an automatic transmission that can be manually shifted in response an operation by a driver, overspeeding of the engine can be appropriately suppressed while a manual shift in response to an operation by the driver can be executed without bothering the driver.

Also, in the control apparatus and control method described above, limiting overspeeding may involve limiting the number of accepted downshifts based on at least one of an accelerator operation amount at the time of the downshift operation, a vehicle speed at the time of the downshift operation, and a gear established in the automatic transmission at the time of the downshift operation.

According to the control apparatus and control method described above, the number of accepted downshifts is limited based on at least one of an accelerator operation amount at the time of the downshift operation, a vehicle speed at the time of the downshift operation, and a gear established in the automatic transmission at the time of the downshift operation. Accordingly, for example, it is determined that the engine is less apt to overspeed as a result of a downshift when the accelerator operation amount is small compared to when it is large, when the gear established in the automatic transmission is lower than when it is higher, or when the vehicle speed at the time of a downshift operation is lower than when it is higher. Therefore, the number of accepted downshifts can be increased so that more downshifts requested by the driver can be executed.

Also, in the control apparatus and control method described above, limiting overspeeding may involve increasing the number of accepted downshifts when the accelerator operation amount at the time of the downshift operation is small compared to when the accelerator operation amount at the time of the downshift operation is large.

According to the control apparatus and control method described above, the number of accepted downshifts is increased more when the accelerator operation amount at the time of the downshift operation is small than it is when the accelerator operation amount at the time of the downshift operation is large. Therefore, when the accelerator operation amount is small and it is therefore considered unlikely that the engine will overspeed, more downshifts requested by the driver can be executed.

Also, in the control apparatus and control method described above, limiting overspeeding may involve increasing the number of accepted downshifts when the gear established in the automatic transmission at the time of the downshift operation is lower compared to when the gear established in the automatic transmission at the time of the downshift operation is higher.

According to the control apparatus and control method described above, the number of accepted downshifts is increased more when the gear established in the automatic transmission at the time of the downshift operation is lower than it is when the gear established in the automatic transmission at the time of the downshift operation is higher. Therefore, when the gear established in the automatic transmission at the time of the downshift operation is a low gear and it is therefore considered unlikely that the engine will overspeed, more downshifts requested by the driver can be executed.

Also, in the control apparatus and control method described above, limiting overspeeding may involve increasing the number of accepted downshifts when the vehicle speed at the time of the downshift operation is low compared to when the vehicle speed at the time of the downshift operation is high.

According to the control apparatus and control method described above, the number of accepted downshifts is increased when the vehicle speed at the time of the downshift operation is low compared to when the vehicle speed at the time of the downshift operation is high. Therefore, when the vehicle speed is low and it is therefore considered unlikely that the engine will overspeed, more downshifts requested by the driver can be executed.

The invention also, provides a program for directing a computer to execute the control method, as well as a recording medium on which is recorded, so as to be readable by a computer, a program for directing a computer to execute the control method.

The program and recording medium make it possible to realize the control method described above using a computer (either a general purpose computer or a special computer).

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF THE EMBODIMENTS

Example embodiments of the present invention will be described in greater detail below with reference to the accompanying drawings. In the following description, like parts will be denoted by like reference characters and referred to by the same nomenclature and have the same functions. Therefore, detailed descriptions of those parts will not be repeated.

Figure 1:
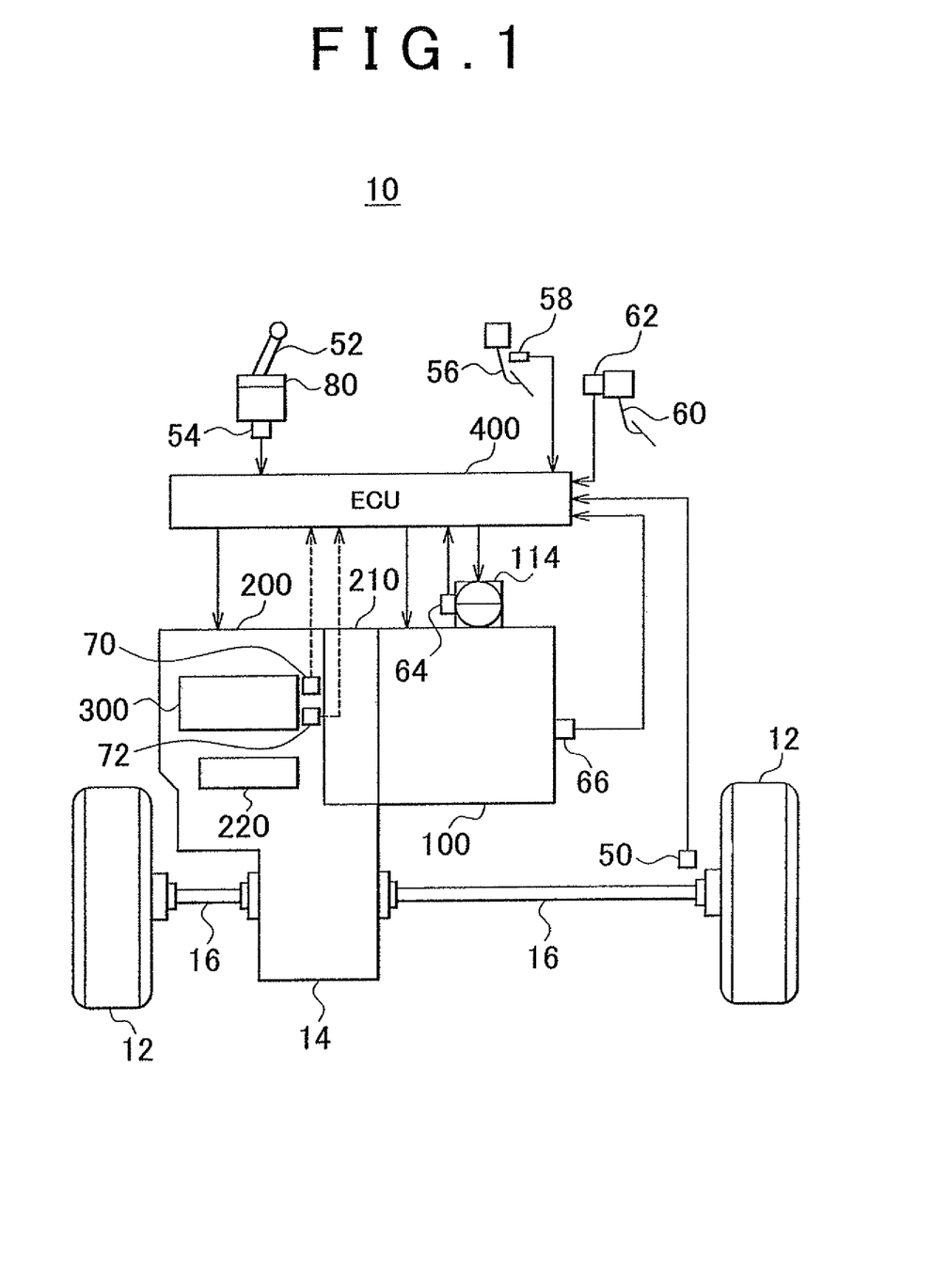
FIG. 1 is a view of the structure of a vehicle provided with a control apparatus according to an example embodiment of the invention.

A vehicle 10 provided with a control apparatus according to an example embodiment of the invention will now be described with reference to FIG. 1. The vehicle 10 is a FF (Front engine, Front drive) vehicle but is not limited to this.

The vehicle 10 has an engine 100, a torque converter 210, an automatic transmission 200, driving wheels 12, a differential gear 14, a drive shaft 16, and an ECU (Electronic Control Unit) 400.

The engine 100 is an internal combustion engine that burns a mixture of air and fuel injected from a fuel injector, not shown, in a combustion chamber of a cylinder. Force generated by the combustion of this air-fuel mixture forces a piston in the cylinder down, which causes a crankshaft to rotate.

The automatic transmission 200 includes a planetary gear unit 300 and a hydraulic circuit 220. The automatic transmission 200 is connected to the engine 100 via the torque converter 210. The hydraulic circuit 220 controls the operating states of clutch elements and brake elements in the planetary gear unit 300 according to shift commands from the ECU 400. As a result, the automatic transmission 200 establishes a desired gear thereby changing the rotation speed of the crankshaft to a desired rotation speed.

An output gear of the automatic transmission 200 is in mesh with the differential gear 14 which is connected by spline engagement or the like to the drive shaft 16. Power is transmitted to the left and right driving wheels 12 via the drive shaft 16.

The ECU 400 is connected via a harness or the like to a vehicle speed sensor 50, a position switch 54 of a shift lever 52 that is provided so as to be able to move along a shift path formed in a shift gate 80, an accelerator operation amount sensor 58 of an accelerator pedal 56, a stroke sensor 62 of a brake pedal 60, a throttle opening amount sensor 64 of an electronic throttle valve 114, an engine speed sensor 66, an input shaft rotation speed sensor 70, and an output shaft rotation speed sensor 72.

The vehicle speed sensor 50 detects the speed V of the vehicle 10 (also simply referred to as "vehicle speed V") from the rotation speed of the drive shaft 16 and outputs a signal indicative of the detection results to the ECU 400.

The position switch 54 detects the position (i.e., shift position) SP of the shift lever 52 and outputs a signal indicative of the detection results to the ECU 400. The gear of the automatic transmission 200 that corresponds to the shift position SP is established automatically.

The accelerator operation amount sensor 58 detects the operation amount (i.e., accelerator operation amount) ACC of the accelerator pedal 56 and outputs a signal indicative of the detection results to the ECU 400.

The stroke sensor 62 detects the stroke amount (i.e., brake stroke amount) BS of the brake pedal 60 and outputs a signal indicative of the detection results to the ECU 400.

The throttle opening amount sensor 64 detects the opening amount (i.e., throttle opening amount) of the electronic throttle valve 114, the opening amount of which is adjusted by an actuator, and outputs a signal indicative of the detection results to the ECU 400. The amount of air drawn into the engine 100 (i.e., the output of the engine 100) is adjusted by the electronic throttle valve 114.

The engine speed sensor 66 detects the speed (i.e., engine speed) NE of the output shaft of the engine 100 and outputs a signal indicative of the detection results to the ECU 400.

The input shaft rotation speed sensor 70 detects the input shaft rotation speed NIN of the automatic transmission 200 and outputs a signal indicative of the detection results to the ECU 400. The output shaft rotation speed sensor 72 detects the output shaft rotation speed NOUT of the automatic transmission 200 and outputs a signal indicative of the detection results to the ECU 400.

The ECU 400 controls various equipment to achieve the desired running state of the vehicle 10 based on the signals sent from the vehicle speed sensor 50, the position switch 54, the accelerator operation amount sensor 58, the stroke sensor 62, the throttle opening amount sensor 64, the engine speed sensor 66, the input shaft rotation speed sensor 70, the output shaft rotation speed sensor 72, and the like, as well as maps and programs stored in ROM (Read Only Memory).

In this example embodiment, when the D (drive) range of the automatic transmission 200 is selected by shifting the shift lever 52 into the D (drive) position, the ECU 400 controls the automatic transmission 200 to establish a gear from 1st gear to 6th gear. Establishing a gear from 1st gear to 6th gear enables the automatic transmission 200 to transmit driving force to the driving wheels 12. Incidentally, the gears that can be established in the automatic transmission 200 are not limited to 1st gear to 6th gear.

Next, the shift gate 80 will be described with reference to FIG. 2. A shift path 82 is formed in the shift gate 80, as shown in the drawing. The shift lever 52 is provided so as to be able to move along this shift path 82. A plurality of shift positions corresponding to the shift positions of the automatic transmission 200 are set in the shift path 82 in the shift gate 80. The plurality of shift positions include, for example, a forward drive position (hereinafter simply referred to as the "(D) position"), a neutral position (hereinafter simply referred to as the "(N) position"), a park position (hereinafter simply referred to as the (P) position), and a reverse position (hereinafter simply referred to as the "(R) position"). The shift gate 80 is formed such that the shift lever 52 can be shifted from a position corresponding to the (P) position into the (R) position, the (N) position, or the (D) position, which are shown below the (P) position on the paper on which FIG. 2 is drawn.

Also, a sub-gate 84 is connected to the shift path 82. The shift path 82 is connected to the center portion, in the vertical direction with respect to the paper on which FIG. 2 is drawn, of the sub-gate 84. The center portion of the sub-gate 84 is a shift position that corresponds to a manual shift mode in which the driver can select an appropriate gear by operating the shift lever 52 (hereinafter, this shift position will simply be referred to as the "(M) position"). The shift lever 52 comes to be in the (M) position by being shifted to the right of the paper on which FIG. 2 is drawn from the (D) position.

Figure 2:
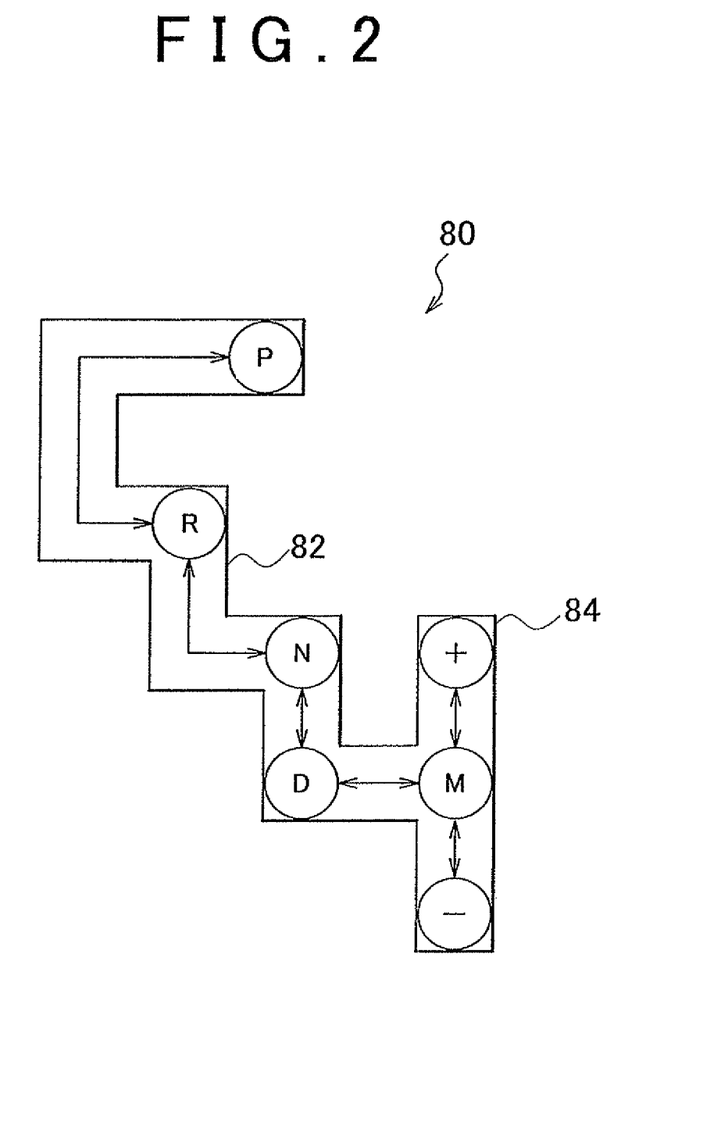
FIG. 2 is a diagram showing the pattern of a shift gate in the example embodiment of the invention.

In the sub-gate 84, the shift lever 52 comes to be in a (+) position when shifted toward the top of the paper on which FIG. 2 is drawn from the (M) position, and comes to be in a (−) position when shifted toward the bottom of the paper on which FIG. 2 is drawn. Incidentally, the pattern of the shift gate 80 is not particularly limited to this. Also, the shift gate 80 may be provided near the driver's seat and oriented such that the top of the paper on which FIG. 2 is drawn points toward the front of the vehicle, or provided near the driver's seat and oriented such that the top of the paper on which FIG. 2 is drawn points upward with respect to the vehicle.

The driver moves the shift lever 52 along the shift path 82 formed in the shift gate 80 and into a desired position (i.e., shift position). The driver can select the power transmission state of the automatic transmission 200 by changing the position of the shift lever 52.

When the driver shifts the shift lever 52 into the (D) position, a signal indicating that the (D) position has been selected is output from the position switch 34. Upon receiving the signal indicating that the (D) position has been selected, the ECU 400 controls the automatic transmission 200 so that the vehicle travels forward in an automatic shift mode.

When the automatic shift mode is selected, the ECU 400 shifts the automatic transmission 200 automatically based on a shift map that has the vehicle speed V and the accelerator operation amount ACC as parameters.

When the driver shifts the shift lever 52 into the (M) position, a signal indicating that the (M) position has been selected is output from the position switch 54. Upon receiving the signal indicating that the (M) position has been selected, the ECU 400 controls the automatic transmission 200 so that the vehicle travels forward in the manual shift mode.

Upon receiving a signal indicating that the driver has shifted the shift lever 52 from the (M) position into the (+) position (hereinafter also referred to as a "(+) operation"), the ECU 400 controls the automatic transmission 200 to establish a gear corresponding to the gear ratio of one gear higher than the gear that is currently established. That is, in the manual shift mode, the automatic transmission is manually upshifted by a (+) operation performed by the driver.

Upon receiving a signal indicating that the driver has shifted the shift lever 52 from the (M) position into the (−) position (hereinafter also referred to as a "(−) operation"), the ECU 400 controls the automatic transmission 200 to establish a gear corresponding to the gear ratio of one gear lower than the gear that is currently established. That is, in the manual shift mode, the automatic transmission is manually downshifted by a (−) operation performed by the driver.

Figure 3:
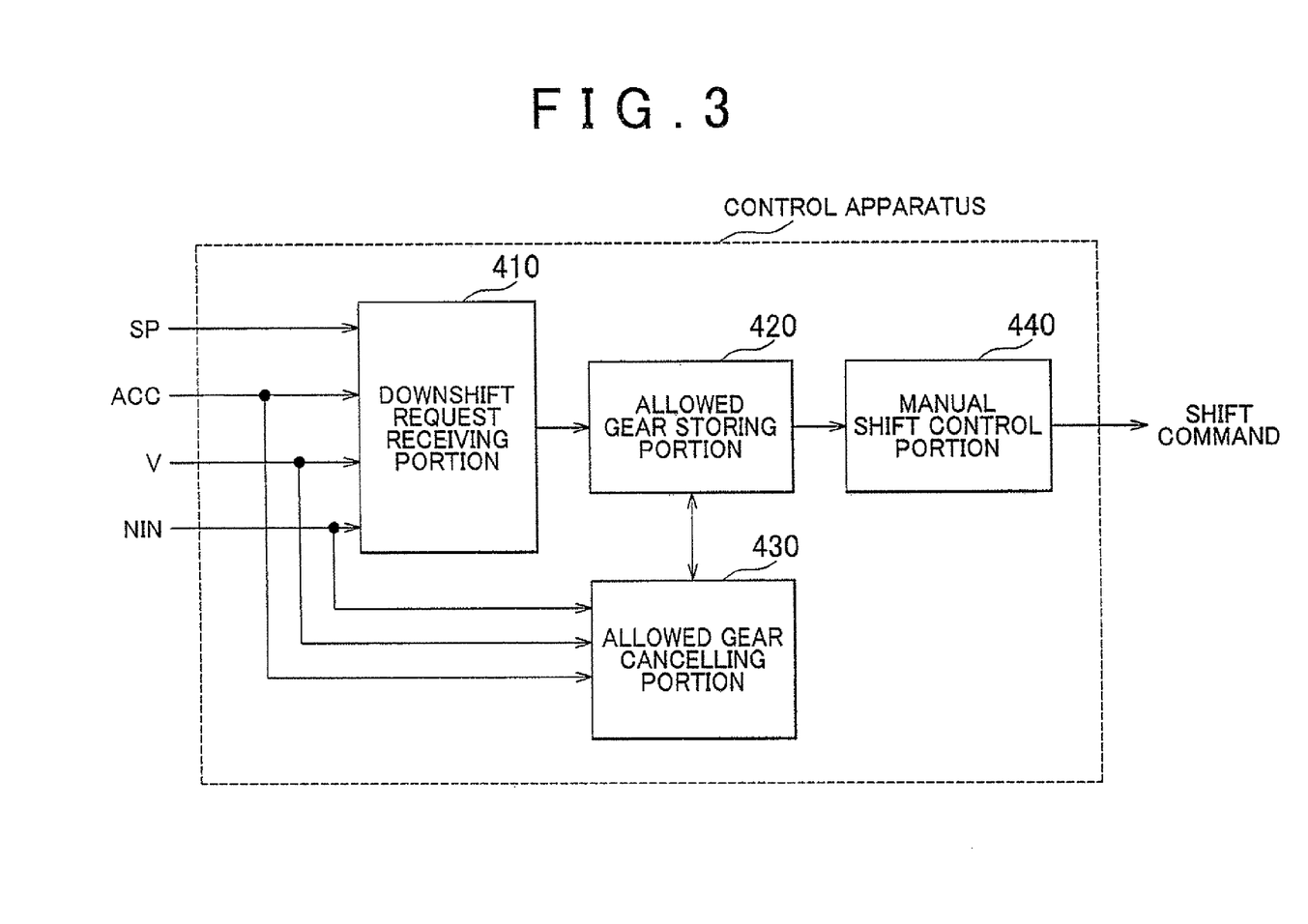
FIG. 3 is a functional block diagram of the control apparatus according to the example embodiment of the invention.

Next, the functional block diagram of the control apparatus according to this example embodiment will be described with reference to FIG. 3. As shown in the drawing, this control apparatus includes a downshift request receiving portion 410, an allowed gear storing portion 420, an allowed gear cancelling portion 430, and a manual shift control portion 440.

The downshift request receiving portion 410 makes a shift determination that corresponds to a downshift operation by the driver based on the shift position SP, the accelerator operation amount ACC, the vehicle speed V (or the output shaft rotation speed NOUT), and the input shaft rotation speed NIN, then calculates the requested gear that corresponds to that shift determination, and accepts those requested gears in which the engine speed NE will not be in a preset overspeed region after the shift as "allowed gears." Incidentally, a requested gear is a gear after a downshift based on the shift determination.

The allowed gear storing portion 420 temporarily stores the allowed gear received by the downshift request receiving portion 410.

The allowed gear cancelling portion 430 cancels the allowed gear stored in the allowed gear storing portion 420 based on the accelerator operation amount ACC, the vehicle speed V (or the output shaft rotation speed NOUT), and the input shaft rotation speed NIN. That is, the allowed gear cancelling portion 430 cancels the shift determination corresponding to the downshift operation by the driver. A downshift into the allowed gear that is cancelled by the allowed gear cancelling portion 430 is not executed even if the downshift is accepted at the time of the downshift operation.

The manual shift control portion 440 outputs a shift command (hereinafter also referred to as a "shift output") for executing a shift into an allowed gear stored in the allowed gear storing portion 420 to the hydraulic circuit 220. When there are a plurality of allowed gears stored in the allowed gear storing portion 420, the manual shift control portion 440 successively outputs the shift command to shift into the next allowed gear after waiting until the downshift into the allowed gear for which a shift command is currently being output has ended (i.e., waits until the output shaft rotation speed NOUT is in sync with the input shaft rotation speed NIN at the gear ratio of the allowed gear for which a shift command is currently being output).

The control apparatus according to this example embodiment having these kinds of functional blocks may be realized by hardware that is based on the structure of digital and analog circuits, or by software that is based on a CPU (Central Processing Unit) and memory in the ECU 400, and a program that is read from the memory and executed by the CPU. Realizing the control apparatus by hardware is generally advantageous in terms of operation speed, while realizing the control apparatus by software is generally advantageous in terms of design changes. In the following description, the control apparatus will be described as being realized by software. Incidentally, the recording medium on which such a program is recorded is also one mode of the invention.

Next, the control structure of the program executed by the ECU 400, which serves as the control apparatus according to this example embodiment, when the driver performs a downshift operation will be described with reference to FIG. 4. Incidentally, this program is executed repeatedly at predetermined time cycles.

In step S100, the ECU 400 determines whether the driver has performed a downshift operation (i.e., a (−) operation) based on the signal indicative of the shift position SP sent by the position switch 54. If it is determined that the driver has performed a downshift operation (i.e., YES in step S100), the process proceeds on to step S102. If not (i.e., NO in step S100), the process jumps ahead to step S112.

In step S102, the ECU 400 calculates the requested gear. As described above, the requested gear is the gear after a downshift based on the shift determination. For example, when it has been determined that there have been three consecutive downshift operations while the vehicle is traveling in 6th gear, the ECU 400 calculates the requested gears to be 5th gear, 4th gear, and 3rd gear.

In step S104, the ECU 400 determines whether the engine speed NE after the downshift will be in a preset overspeed region for each requested gear. For example, the ECU 400 determines whether the engine speed NE after the downshift will be in the overspeed region based on a map that has the accelerator operation amount ACC and the vehicle speed V (or the output shaft rotation speed NOUT) as parameters, as shown in FIG. 5. In the map shown in FIG. 5, threshold lines are provided for each gear (1st gear through 6th gear) after a downshift. These threshold lines become higher as the gear after a downshift becomes higher, and also become higher as the accelerator operation amount ACC decreases. If a region containing the point of intersection of the accelerator operation amount ACC and the vehicle speed V crosses a threshold line, the ECU 400 determines that the engine speed NE after a downshift will be in the overspeed region. Therefore, if the vehicle speed V is the same (i.e., at a given vehicle speed V), it is less apt to be determined that the engine speed NE after a downshift will be in the overspeed region as the accelerator operation amount ACC becomes lower, and when the accelerator operation amount ACC is the same (i.e., at a given accelerator operation amount ACC), it is less apt to be determined that the engine speed NE after a downshift will be in the overspeed region as the vehicle speed V becomes lower. Also, if the accelerator operation amount ACC is the same and the vehicle speed V is the same (i.e., at a given accelerator operation amount ACC and a given vehicle speed V), it is less apt to be determined that the engine speed NE after a downshift will be in the overspeed region when the gear after the downshift is a higher gear. Incidentally, the method for determining whether the engine speed NE after a downshift will be in the overspeed region is not limited to this.

In step S106, the ECU 400 determines whether there is a requested shift that will result in the engine speed NE being in the overspeed region. If there is a requested shift that will result in the engine speed NE being in the overspeed region (i.e., YES in step S106), the process proceeds on to step S108. If not (i.e., NO in step S106), the process jumps ahead to step S110.

In step S108, the ECU 400 refuses to accept the requested gear that will result in the engine speed NE being in the overspeed region.

In step S110, the ECU 400 accepts a requested gear that will not result in the engine speed NE being in the overspeed region as an allowed gear and stores it.

In step S112, the ECU 400 executes manual shift control. More specifically, the ECU 400 outputs a shift command to cause the automatic transmission 200 to establish the accepted allowed gear to the hydraulic circuit 220. If there are a plurality of allowed gears, the ECU 400 successively outputs the shift command to shift into the next allowed gear after waiting until the downshift into the allowed gear for which a shift command is currently being output has ended. For example, when there are three allowed gears, e.g., 5th gear, 4th gear, and 3rd gear, the ECU 400 first outputs a command to execute a downshift into 5th gear. After the downshift into 5th gear has ended (i.e., after 5th gear is established), the ECU 400 then outputs the shift command to shift into 4th gear. After the downshift into 4th gear has ended, the ECU 400 then outputs the shift command to shift into 3rd gear. Incidentally, in the following description, the gear specified by the shift command sent from the ECU 400 to be established by the hydraulic circuit 220 may also be referred to as the "output gear."

Figure 6:
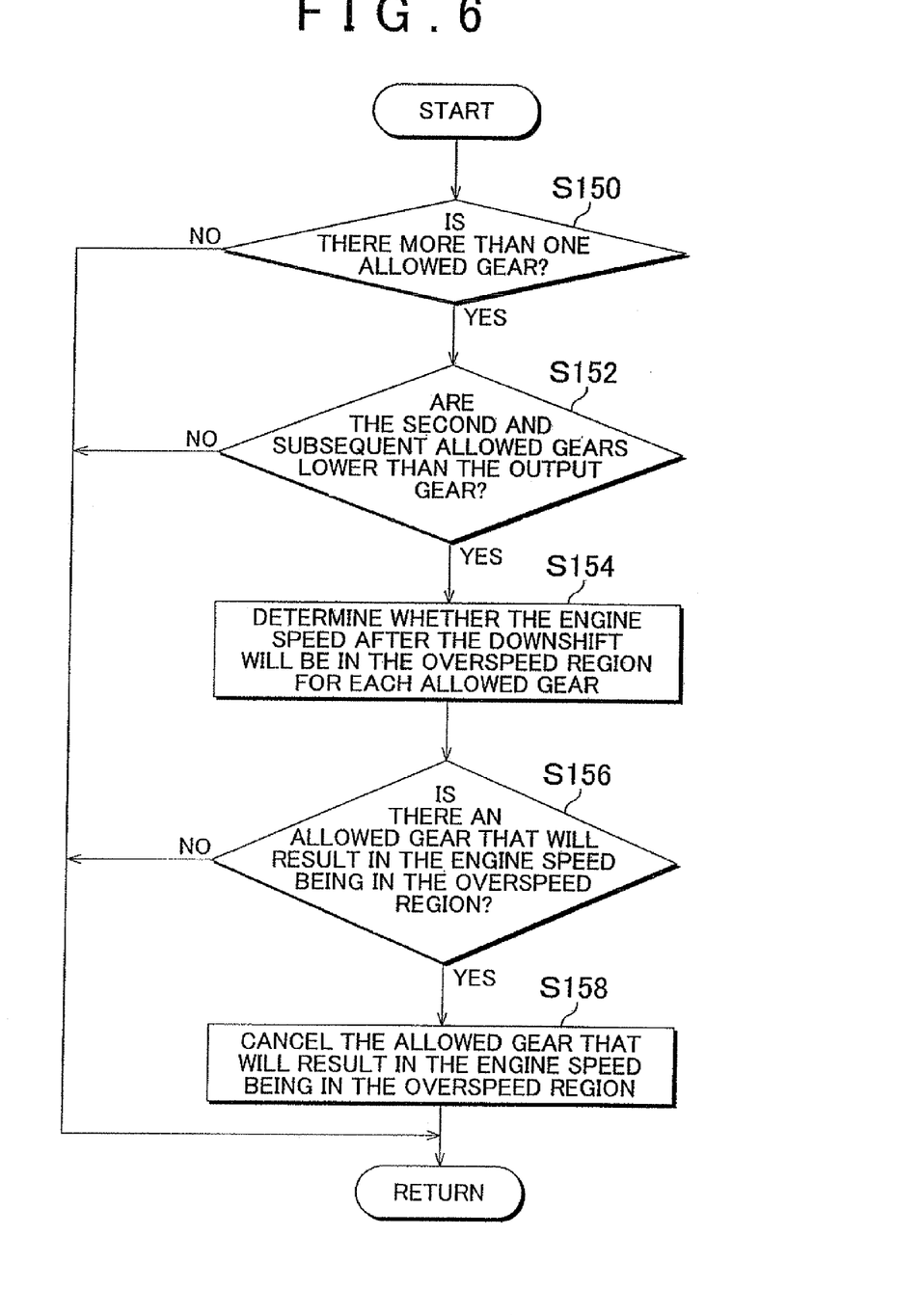
FIG. 6 is a flowchart (part 2) illustrating the control structure of the program executed by the ECU which forms the control apparatus according to the example embodiment of the invention.

Next, the control structure of the program executed by the ECU 400, which serves as the control apparatus according to this example embodiment, during manual shifting will be described with reference to FIG. 6. Incidentally, this program is repeatedly executed at preset time cycles while manual shifting is being executed.

In step S150, the ECU 400 determines whether there is more than one allowed gear. If there is more than one allowed gear (i.e., YES in step S150), the process proceeds on to step S152. If not (i.e., NO in step S150), this cycle of the program ends.

In step S152, the ECU 400 determines whether the second and subsequent allowed gears are lower than the output gear. The second and subsequent allowed gears include any of a plurality of allowed gears (i.e., gears corresponding to a shift determination), except for the highest allowed gear. For example, when there are three allowed gears, such as 5th gear, 4th gear, and 3rd gear, the second and subsequent allowed gears are 4th gear and 3rd gear. 5th gear is excluded because it is the highest. Also, the output gear is the gear that is specified by the shift command sent from the ECU 400 to be established by the hydraulic circuit 220 (i.e., the gear corresponding to the shift output), as described above. If the second and subsequent allowed gears are lower than the output gear (i.e., YES in step S152), the process proceeds on to step S154. If not (i.e., NO in step S152), this cycle of the program ends.

In step S154, the ECU 400 determines whether the engine speed NE after a downshift will be in the preset overspeed region for each of the allowed gears determined to be lower than the output gear. For example, the ECU 400 determines whether the engine speed NE after a downshift will be in the overspeed region based on a map having the accelerator operation amount ACC and the vehicle speed V (or the output shaft rotation speed NOUT) as parameters. Incidentally, the ECU 400 may also determine whether the engine speed NE after a downshift will be in the overspeed region based on a map that is different from the map shown in FIG. 5.

In step S156, the ECU 400 determines whether the there is an allowed gear that will result in the engine speed being in the overspeed region. If there is an allowed gear that will result in the engine speed being in the overspeed region (i.e., YES in step S156), the process proceeds on to step S158. If not (i.e., NO in step S156), this cycle of the program ends.

In step S158, the ECU 400 cancels the allowed gear that will result in the engine speed being in the overspeed region so that the downshift into the allowed gear that will result in the engine speed being in the overspeed region will not be executed. That is, the ECU 400 cancels the shift determination that will result in the engine speed being in the overspeed region.

Next, the operation, which is based on the foregoing structure and flowchart, of the automatic transmission 200 which is controlled by the ECU 400 that serves as the control apparatus according to this example embodiment will be described.

This example assumes that three consecutive downshift operations are performed while the vehicle is traveling in 6th gear. In this case, 5th gear, 4th gear, and 3rd gear are calculated as the requested gears at the time of the downshift operations (step S102), and whether the engine speed NE after the downshift will be in the overspeed region is determined for each requested gear (step S104).

If it is determined at the time of the downshift operations that none of the requested gears (i.e., 5th gear, 4th gear, and 3rd gear) will result in the engine speed NE after the downshift being in the overspeed region (i.e., NO in step S106), then these requested gears are accepted as allowed gears and stored (step S110).

When the allowed gears are accepted, manual shift control is executed (step S112), and as a result, a downshift into 5th gear which is the closest gear to the gear ratio of 6th gear is executed. The downshift into 4th gear is executed after the downshift into 5th gear has ended. Therefore, the downshift into 4th gear is delayed with respect to the downshift operation by the driver. Furthermore, the downshift into 3rd gear is executed after the downshift into 4th gear has ended. Therefore, the downshift into 3rd gear is also delayed with respect to the downshift operation by the driver.

Thus, while the output gear is 5th gear (i.e., during the downshift into 5th gear), it continues to be determined whether the engine speed NE after the downshift into 4th gear and 3rd gear, which are lower than the output gear (i.e., 5th gear), will be in the preset overspeed region for each of the gears (i.e., YES in step S152; step S154).

If at this time it is determined that the downshift into 4th gear or 3rd gear will cause the engine speed NE to be in the overspeed region (i.e., YES in step S156), the downshift into the gear for which it has been determined that it will cause the engine speed NE to be in the overspeed region is cancelled (step S158). Accordingly, the downshift into 4th gear or 3rd gear that had been allowed at the time of the downshift operation can be cancelled if there is a possibility that the engine may overspeed due to a change in the accelerator operation amount ACC or the vehicle speed V while the downshift into 5th gear is being executed. Moreover, because the downshift into 4th gear or 3rd gear is cancelled at the point that it is determined that there is a possibility that the engine may overspeed, a downshift will not be executed suddenly once the engine speed NE will no longer be in the overspeed region after a predetermined period of time has passed, so the driver will not feel odd or be bothered.

On the other hand, the downshifts into 4th gear and 3rd gear are not cancelled but are instead executed (step S112) only when it is determined that the downshift into 4th gear and 3rd gear will not result in the engine speed NE being in the overspeed region (i.e., NO in step S156).

Furthermore, the overspeed region determination at the time of a downshift operation (step S104) and the overspeed region determination after a downshift operation (step S154) are made based on a map such as that shown in FIG. 5 described above. That is, as described above, even when the vehicle speed V is the same (i.e., even at a given vehicle speed V), it is less apt to be determined that the engine speed NE will be in the overspeed region when the accelerator operation amount ACC is low. Therefore, the region where a downshift requested by the driver is allowed can be expanded compared to when it is determined that the engine will overspeed based on the vehicle speed V.

As described above, with the control apparatus according to this example embodiment, when a plurality of consecutive downshift operations are detected and the required gear corresponding to the shift determination is lower than the output gear corresponding to the shift output, it is determined whether the engine would overspeed as a result of a downshift into the requested lower gear, and a shift determination corresponding to a requested shift for which it is determined that engine overspeeding will ensue is cancelled. Therefore, even if a requested gear is tentatively allowed at the time of a downshift operation, a downshift into a requested gear that may cause the engine to overspeed if the vehicle speed increases after the downshift operation or the like is cancelled. Accordingly, the engine can be inhibited from overspeeding. In addition, it is possible to inhibit a downshift from being performed suddenly compared to a case in which the shift determination is not cancelled but instead the shift output is simply delayed until the engine would no longer be in the overspeed region. Furthermore, the number of times a downshift can be executed in response to an operation by the driver is not limited as long as it is determined that that downshift will not result in the engine overspeeding.

Incidentally, this example embodiment describes an example in which an arbitrary gear is selected in response to the operation of the shift lever 52. Alternatively, however, an arbitrary gear may also be selected in response to the operation of a paddle switch, for example, instead of the operation of the shift lever 52.

Also, the invention may also be applied when selecting the highest gear in the automatic shift mode when the highest gear into which the automatic transmission can be automatically shifted (i.e., the gear ratio range through which automatic shifting is possible) is selected in response to the paddle switch operation described above when in the automatic shift mode, for example. In this case, the value of the threshold line (i.e., the value that determines overspeeding of the engine) shown in FIG. 5 may be set differently when a gear is selected in the manual shift mode than it is when the highest gear is selected in the automatic shift mode.

Moreover, in a vehicle having a plurality of modes with different running characteristics requested by the driver, such as a sport mode and a normal mode and the like, the value of the threshold line shown in FIG. 5 may be set differently for each mode.

Figure 4:
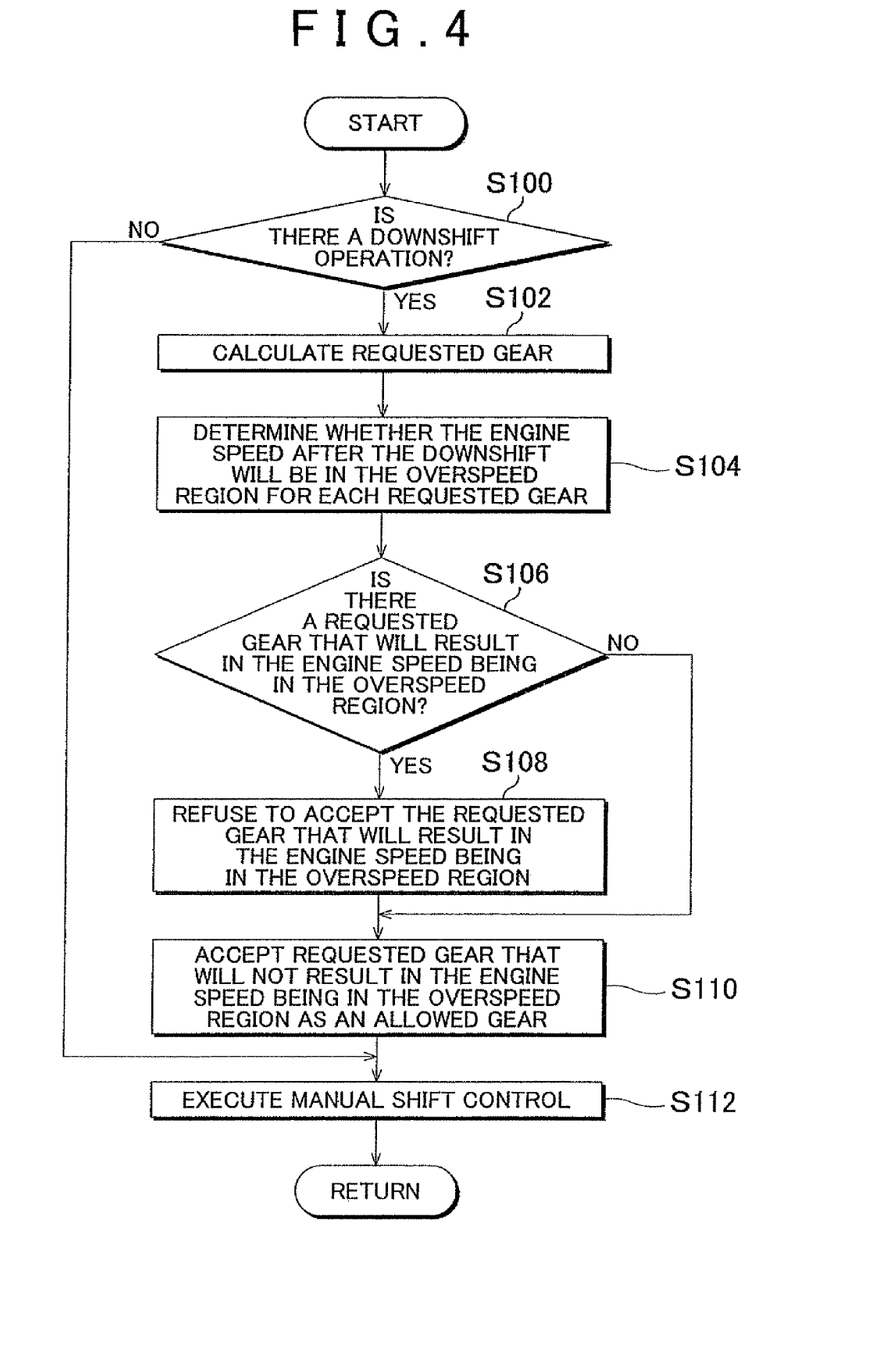
FIG. 4 is a flowchart (part 1) illustrating the control structure of a program executed by an ECU which forms the control apparatus according to the example embodiment of the invention.
Figure 5:
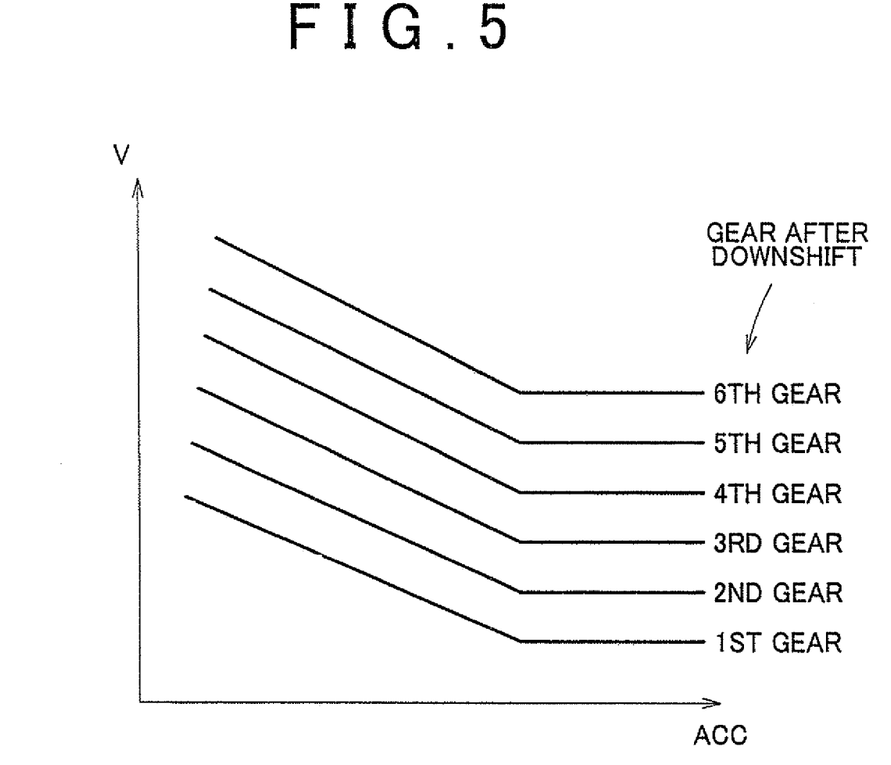
FIG. 5 is a chart showing the relationship between vehicle speed, accelerator operation amount, and an overspeed region of the engine speed.
Figure 7:
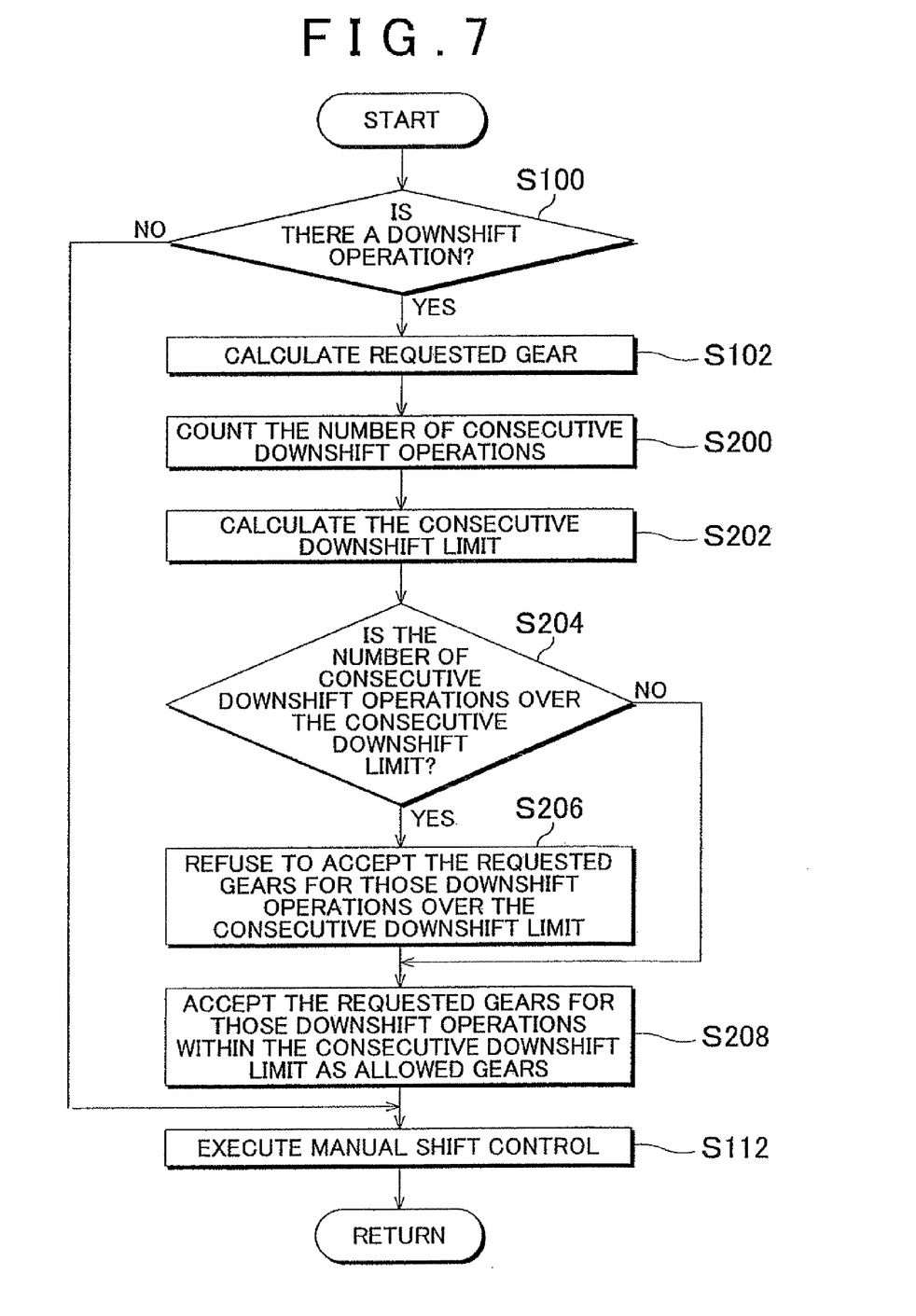
FIG. 7 is a flowchart illustrating the control structure of another program executed by an ECU which forms the control apparatus according to the example embodiment of the invention.

Instead of the structure shown in the flowchart in FIG. 4 described above, the control structure of the program executed by the ECU 400 according to the foregoing example embodiment when the driver performs a downshift operation may also be changed to the structure shown in the flowchart shown in FIG. 7.

Next, the control structure of a program executed by the ECU 400 which serves as the control apparatus of this example embodiment will be described with reference to FIG. 7. Incidentally, steps in the flowchart shown in FIG. 7 that are the same as steps in the flowchart shown in FIG. 4 described above will be denoted by the same step numbers and involve the same processes so detailed descriptions of those steps will not be repeated here.

In step S200, the ECU 400 counts the number of consecutive downshift operations performed. The ECU 400 counts the number of times it is determined that there are a plurality of downshift operations within a period of time which is shorter than a preset period of time, for example, as the number of consecutive downshift operations.

Figure 8:
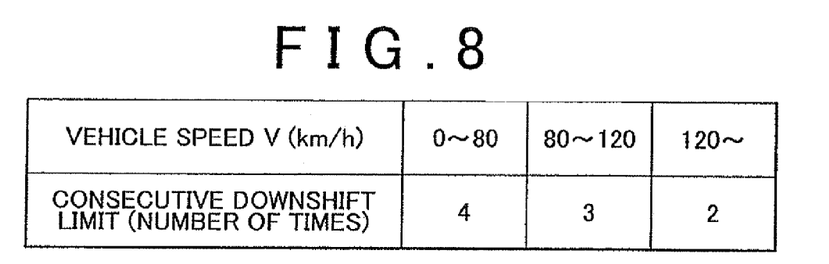
FIG. 8 is a chart showing the relationship between the vehicle speed and the number of times to which continuous downshifting is limited.
Figure 9:
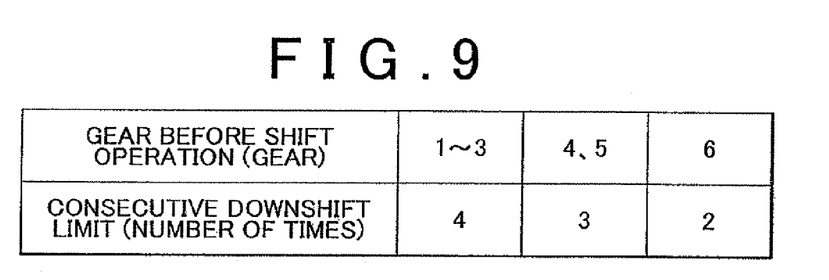
FIG. 9 is a chart showing the relationship between the gear before a shift operation and a consecutive downshift limit.
Figure 10:
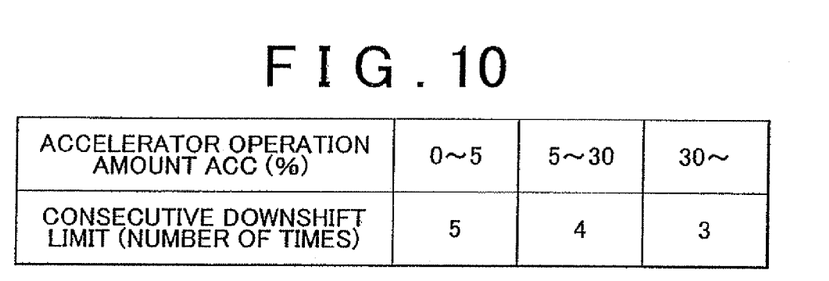
FIG. 10 is a chart showing the relationship between the accelerator operation amount and the consecutive downshift limit.

Then in step S202, the ECU 400 calculates a consecutive downshift limit based on at least one of the vehicle speed V, the gear established in the automatic transmission 200 before the downshift operation, and the accelerator operation amount ACC. The consecutive downshift limit is the maximum value of the number of times it is estimated that downshift operations can be performed without causing the engine speed NE to be in the overspeed region, even if these downshift operations are executed successively. For example, the ECU 400 calculates the consecutive downshift limit to be a larger value when the vehicle speed V is in a lower speed range, as shown in FIG. 8. Also, for example, the ECU 400 calculates the consecutive downshift limit to be a larger value when the gear established in the automatic transmission 200 before the downshift operation is in a lower gear range, as shown in FIG. 9. Moreover, the ECU 400 calculates the consecutive downshift limit to be a larger value when the accelerator operation amount ACC is in a smaller range, as shown in FIG. 10. Incidentally, the ECU 400 may also calculate consecutive downshift limits based on two or more parameters from among the vehicle speed V, the gear before the downshift operation, and the accelerator operation amount ACC, and then select the consecutive downshift limit of the lowest number, from among the calculated consecutive downshift limits.

In step S204, the ECU 400 determines whether the number of consecutive downshift operations is over the consecutive downshift limit. If the number of consecutive downshift operations is over the consecutive downshift limit (i.e., YES in step S204), the process proceeds on to step S206. If not (i.e., NO in step S204), the process jumps ahead to step S208.

In step S206, the ECU 400 refuses to accept the requested gear for those downshift operations over the consecutive downshift limit.

In step S208, the ECU 400 accepts and stores the requested gears for those downshift operations within the consecutive downshift limit as allowed gears.

As described above, when a plurality of consecutive downshift operations are detected, the number of consecutive downshifts is limited at the time of the downshift operation to the consecutive downshift limit at which it is estimated that the engine speed NE will not be in the overspeed range even if these consecutive downshifts are executed successively (step S206). Therefore, the number of accepted downshifts is reduced and overspeeding of the engine is suppressed at the time of a downshift operation.

Furthermore, as shown in FIGS. 8, 9, and 10 described above, the consecutive downshift limit is calculated to be a larger number when it is unlikely that overspeeding of the engine will occur, such as when the accelerator operation amount is small, the gear before the downshift operation is a lower gear, or the vehicle speed is low (step S202). Accordingly, overspeeding of the engine can be appropriately suppressed while a manual shift in response to an operation by the driver can be executed without bothering the driver.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

The invention claimed is:

1. A control apparatus for an automatic transmission that is connected to an engine, and that can be manually shifted in response to an operation by a driver, comprising:
   a detecting device that detects a downshift operation by the driver;
   a shift determining device that makes a shift determination corresponding to the detected downshift operation;
   an output device that outputs a shift output based on the shift determination to the automatic transmission;
   an overspeed determining device which, when there is a shift determination that is different from the shift output as a result of the downshift operation being detected successively, determines whether the engine will overspeed as a result of a downshift based on the different shift determination; and
   a cancelling device that cancels a shift determination that is determined to cause the engine to overspeed, wherein
   when there are a plurality of the different shift determinations, the overspeed determining device continues to determine for each of the different shift determinations whether the engine will overspeed while those different shift determinations are different from the shift output, and the overspeed determining device determines whether the engine will overspeed based on a vehicle speed and an accelerator operation amount in such a manner that even when the vehicle speed is the same, a probability for it to be determined that the engine will overspeed is reduced as the accelerator operation amount becomes lower.

2. The control apparatus according to claim 1, wherein the overspeed determining device determines whether the engine will overspeed based on at least one of the vehicle speed and the accelerator operation amount.

3. The control apparatus according to claim 1, wherein
the overspeed determining device determines that the engine will overspeed when the vehicle speed is higher than a reference value, and determines that the engine will not overspeed when the vehicle speed is lower than the reference value; and the reference value is set to be larger as the accelerator operation amount becomes lower.

4. The control apparatus according to claim 1, wherein
the overspeed determining device determines that the engine will overspeed when the vehicle speed is higher than a reference value, and determines that the engine will not overspeed when the vehicle speed is lower than the reference value; and the reference value is set to a predetermined constant value when the accelerator operation amount is larger than a prescribed value, and the reference value is set to be larger as the accelerator operation amount becomes smaller when the accelerator operation amount is smaller than the prescribed value.

5. A control method for an automatic transmission that is connected to an engine, and that can be manually shifted in response to an operation by a driver, comprising:

detecting a downshift operation by the driver;

making a shift determination corresponding to the detected downshift operation;

outputting a shift output based on the shift determination to the automatic transmission;

determining whether the engine will overspeed as a result of a downshift based on the different shift determination when there is a shift determination that is different from the shift output as a result of the downshift operation being detected successively; and canceling a shift determination that is determined to cause the engine to overspeed, wherein making the shift determination includes, when there are a plurality of different shift determinations, continuing to determine for each different shift determination whether the engine will overspeed while those different shift determinations are different from the shift output, and determining whether the engine will overspeed based on a vehicle speed and an accelerator operation amount in such a manner that even when the vehicle speed is the same, a probability for it to be determined that the engine will overspeed is reduced as the accelerator operation amount becomes lower.

6. The control method according to claim 5, wherein making the shift determination includes determining whether the engine will overspeed based on at least one of the vehicle speed and the accelerator operation amount.

7. The control method according to claim 5, wherein
making the shift determination includes determining that the engine will overspeed when the vehicle speed is higher than a reference value, and determining that the engine will not overspeed when the vehicle speed is lower than the reference value; and the reference value is set to be larger as the accelerator operation amount becomes lower.

8. The control method according to claim 5, wherein
making the shift determination includes determining that the engine will overspeed when the vehicle speed is higher than a reference value, and determining that the engine will not overspeed when the vehicle speed is lower than the reference value; and the reference value is set to a predetermined constant value when the accelerator operation amount is larger than a prescribed value, and the reference value is set to be larger as the accelerator operation amount becomes smaller when the accelerator operation amount is smaller than the prescribed value.

9. A non-transitory computer-readable medium storing a program for directing a computer to execute a control method for an automatic transmission that is connected to an engine, and that can be manually shifted in response to an operation by a driver, comprising:

detecting a downshift operation by the driver;

making a shift determination corresponding to the detected downshift operation;

outputting a shift output based on the shift determination to the automatic transmission;

when there is a shift determination that is different from the shift output as a result of the downshift operation being detected successively, determining whether the engine will overspeed as a result of a downshift based on the different shift determination;

cancelling a shift determination that is determined to cause the engine to overspeed, when there are a plurality of different shift determinations, continuing to determine for each different shift determination whether the engine will overspeed while those different shift determinations are different from the shift output; and determining whether the engine will overspeed based on a vehicle speed and an accelerator operation amount in such a manner that even when the vehicle speed is the same, a probability for it to be determined that the engine will overspeed is reduced as the accelerator operation amount becomes lower.

* * * * *